March 4, 1952 — N. D. NACHTRIEB — 2,587,878
LEVELING INSTRUMENT
Filed Nov. 18, 1950
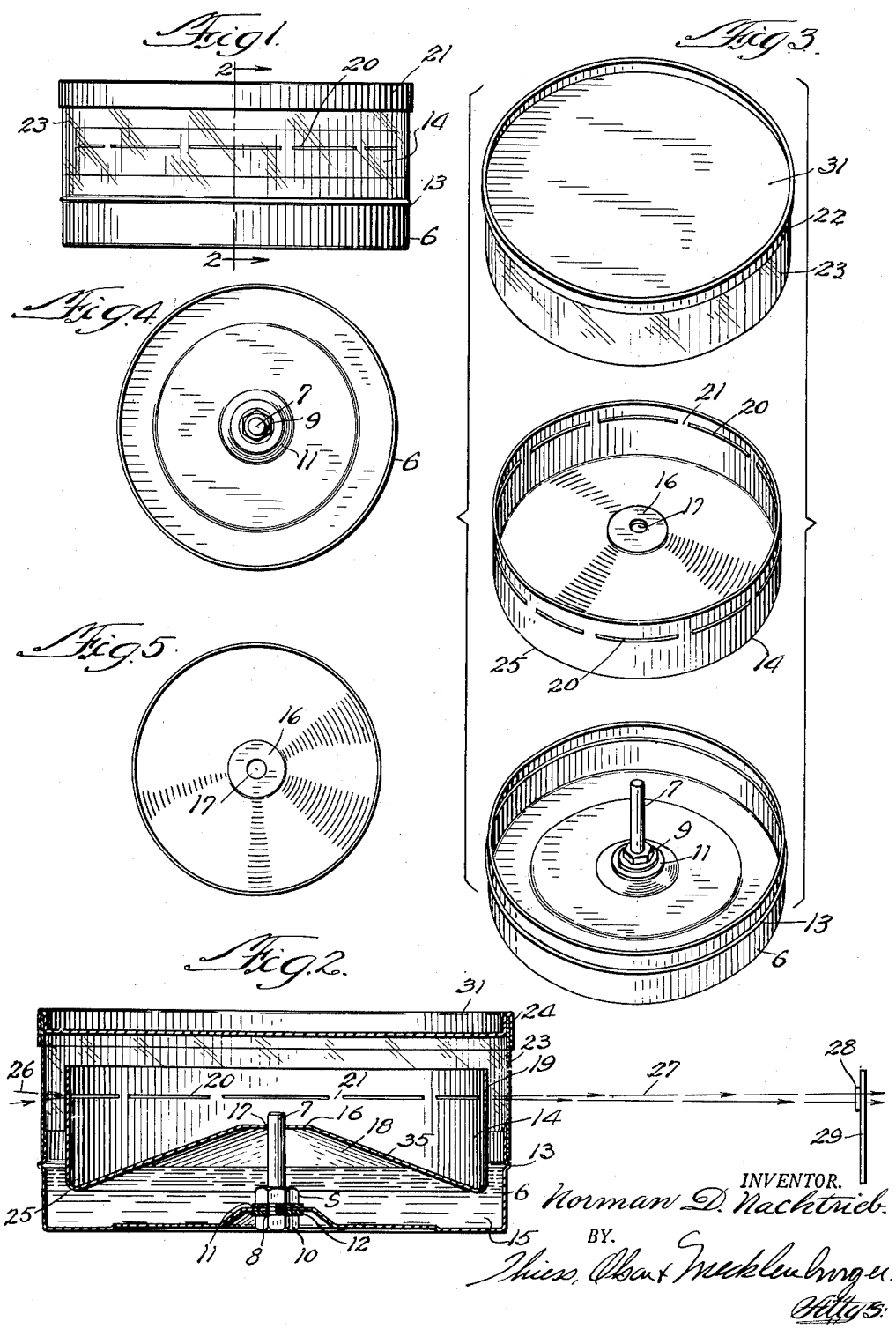
INVENTOR.
Norman D. Nachtrieb Patented Mar. 4, 1952

2,587,878

UNITED STATES PATENT OFFICE 2,587,878

LEVELING INSTRUMENT

Norman D. Nachtrieb, Chicago, Ill.

Application November 18, 1950, Serial No. 196,419

10 Claims. (Cl. 33—73)

The present invention relates to improvements in leveling instruments, being particularly directed to a comparatively simple instrument which is characterized by accuracy and ease of use.

In surveying and in the laying out of foundations, in contour plowing, landscape gardening, road construction, etc., it becomes necessary accurately to determine horizontal levels. This has usually been accomplished by means of the use of rather cumbersome and expensive surveying instruments, or else has been done by stretching a string or cord in cooperation with a spirit level. The latter method is often used in laying out foundations of buildings, a string being attached to an upright post at a predetermined distance above the ground, whereupon another post is driven slightly beyond the point where the wall or the like is to be placed, whereupon one person stretches a string toward the second post and then moves it up and down while another person somewhere along the extent of the string watches the position thereof with a thereto applied spirit level, giving directions to the other person for raising or lowering the string until it is apparently extending in a horizontal and level direction, whereupon the string is fastened to the second post under tension. It will be self-evident that due to the weight of the string, and the possible insufficient tension thereon, such a method is at best an approximation.

It therefore is evident that any means which uses light would be vastly superior, and for that reason accurate sighting instruments have always employed the principle of viewing through some sighting device, usually in conjunction with some form of liquid-supported means having sights, peep holes, and crossed hairs thereon. Examples of such instruments are those shown in the patents to Hailey 26,762 of 1860, Prier 701,612 of 1902, and Tryon 867,587. Particularly in the device shown in the Prier patent, a float was used provided with sighting means for the purposes of establishing the level. However, this instrument still required the use of a plumb bob and also could only be used, by reason of the relatively small peep hole and corresponding crossed hairs, at only a very definitely predetermined single spot, but would not have the ability readily to determine the level of a considerable sweep. Moreover, the float therein had a completely flat bottom under which bubbles could easily collect, and besides this, the float did not inherently float level, but required adjustment by the addition of certain weights, which were to be placed in apertures provided for that purpose. It therefore was lacking in inherent accuracy.

The present instrument may be considered as a great improvement upon the instrument of the Prier patent in that it is far superior and inherently of a much greater stability and accuracy.

Accordingly it is one of the objects of the present invention to provide a leveling instrument which may be used by relatively inexperienced persons.

It is a further object of the present invention to provide a leveling instrument which is protected against disturbance by air currents or wind, and the accuracy of which can be predetermined by proper construction, being so made that the accuracy will be indefinitely preserved.

A still further object of the invention is to provide a leveling instrument having inherent means to prevent the inaccurate positioning of the therein contained float, all as will be hereinafter more fully explained in connection with the concurrently filed sheet of drawings, in which:

Fig. 1 is a side view of the leveling instrument;

Fig. 2 is a vertical section therethrough along the line 2—2 of Fig. 1;

Fig. 3 is an expanded perspective view of the instrument showing the three parts thereof;

Fig. 4 is a top plan view of the trough or base of the instrument, while

Fig. 5 is a plan view of the float of the instrument.

The leveling instrument of the present invention consists of a trough or base 6, which is preferably but not necessarily circular in shape, and has a central inner upstanding pin or bearing 7, which may be secured in any suitable fashion, for example, as shown in the figures, by having a suitable hole 8 in the bottom of the trough or base through which extends the pin 7 which is provided with threads of sufficient length to receive the inwardly located nut 9 and the outer nut 10 with the interposition of gaskets 11 and 12 to provide a liquid-tight seal. It will be self-evident, however, that the pin or bearing 7 may be made integral with the bottom of the trough 6 provided the same is made of suitable material; for example, if it were molded out of plastic material the provision of such a pin as an integral part thereof would be relatively simple, but when the trough is made of metal, a construction somewhat along the lines just indicated is more feasible. It will be noticed that the trough 6 is provided with a peripheral bead or shoulder 13 for a purpose which will later become apparent.

Contained within the trough or base 6 is a float 14, which, as can best be seen from the section in Fig. 2, is provided with an inwardly extending concave bottom 35. This concavity may be either parabolical, a part of a sphere, or preferably conically concave. It is also preferably, but not necessarily, provided with a horizontal portion 16 and is provided with an aperture 17 through which the pin or bearing 7 is intended to extend when the instrument is in use, as for example when the float 14 is floating upon a liquid 15 contained in the trough 6. This liquid may be water, or if the instrument is to be used in cold weather, may consist partly of alcohol or some other relatively non-freezing liquid; mercury may be used, but because it is heavy and expensive, would generally not be recommended.

By reason of the concave bottom it will be seen that the water or other liquid will extend only part way upwardly on the inside of the conical bottom 35 of the float 14, leaving an air space 18 which is in free communication with the air through the aperture 17 by reason of the fact that this aperture is slightly larger than the pin or bearing 7. This is an important feature, because it permits the ready escape of any bubbles of air which might be trapped under the float for if it had a flat bottom, it would be prevented from accurately floating truly horizontally upon the supporting liquid 15.

The float 14 is also provided in its upstanding flange 19 with a plurality of accurately positioned opposed horizontally extending elongated sighting-slots or slits 20, there being intervening solid portions 21, which serve to support the upper portion of the flange 19. These slots or slits 20 are quite narrow and are intended to be looked through when using the instrument, as will hereinafter be more fully described. These slots or slits 20 are also very accurately positioned relative to the bottom of the float; in other words, the slots are accurately parallel with a plane tangent to the bottom rim 25 of the float.

In order to prevent disturbance by air currents, such as wind when used outdoors, the instrument is provided with a cover 31 having a dependent flange 22, a further extension 23 of which is made of transparent material such as some form of plastic, for example Celluloid, cellulose acetate, styrene or methylmethacrylate plastic, etc., which is of sufficient stiffness to enable this transparent portion of the cover to be supported upon the aforementioned bead 13. This flange is just sufficiently large enough to fit over that upper portion of the trough 6 which lies above the bead 13. For purposes of holding the transparent portion 23 in the cover 31, the said cover may be provided with a peripheral crimp 24 (see Fig. 2). It is however to be understood as strictly within the scope of the present invention to construct the cover 31 entirely of plastic material so that it will consist of but a single part. However, for ease of construction, and to provide an instrument which is not readily broken, it is generally preferred to employ a material such as aluminum for the construction of the cover, trough and float.

The float, however, may be molded of plastic material, and in fact the entire instrument may be so made, it being important, however, that the slots or slits 20 be very accurately made so that they will be truly parallel with a plane which is tangent to the outer edge or rim 25 of the said conical bottom 15 of the float 14.

When employing the instrument, a liquid is poured into the trough 6 to an extent sufficient so that the float 14 will float freely in the trough, with the pin 7 still extending to some extent through the aperture 17. In such a position the slots 20 will lie somewhere within the transparent portions of the cover. With the instrument placed upon a firm support such as a table, tree stump, or rigid tripod, the cover is removed and the float 14 given a sufficient push to cause it to spin or rotate while floating. The cover is then replaced and the eye of the observer is placed at some distance from the instrument at a level with the slots so that the opposed slots will provide a line of vision. This preliminary precaution is highly advisable because if the float is still wobbling then the slots will not accurately be in horizontal alignment with each other, a fact which thus would be plainly evident to the observer. When the float, however, has come to rest, the opposed slots will then be accurately in horizontal alignment with each other. While the operator of the instrument is observing a line of vision through a pair of opposed slots, a companion goes to the point at which the level is to be established and, in a manner well known in the surveying art, moves a suitable target or other visible indicia upwardly and downwardly on a vertically extending rod or similar implement under the direction of the operator of the instrument until the target is accurately aligned with the line of vision through the instrument. Suitable markers are then put into position. An attempt has been made to indicate this by means of the dotted arrow-headed lines 26 and 27 of Fig. 2, a target 28 supported on a rod 29 being shown diagrammatically.

By reason of the comparative narrowness of the slots 20 which in a particular instrument are about on the order of one-thirty-second of an inch, the amount of parallax is small enough so as not to impair the accuracy of the device. In fact, actual tests of the instrument have shown that when properly used, there will not be an error greater than about three-eighths of an inch when sighting, for example, 500 feet. This is a far higher accuracy than could ever be attained by means of a string and level. By providing the instrument with a transparent cover it may be used even on windy days without danger of being disturbed.

It will be obvious from the foregoing description that considerable modification of the exact shape of the instrument is possible, without departing from the fundamental principles thereof.

I claim:

1. A leveling instrument comprising a liquid-tight trough, a circular float having a vertical wall provided with a plurality of opposed horizontal sighting-slits, said float being adapted freely to float in liquid contained in said trough.

2. A leveling instrument comprising a circular liquid-tight trough, a circular float having a vertical wall and a concave bottom, said wall being provided with a plurality of opposed horizontal sighting-slits, said float being adapted freely to float in liquid contained in said trough.

3. A leveling instrument comprising a circular liquid-tight trough having a centrally located upstanding pin, a circular concave-bottomed float having a central aperture slightly larger in diameter than said pin and having a vertical wall provided with opposed horizontal sighting-slits, said float being adapted freely to float in liquid contained in said trough with said pin extending through said aperture to maintain the float centrally positioned relative to said trough.

4. A leveling instrument as defined in claim 1, and a cover therefor having a dependent transparent flange which fits over and is supported by said trough.

5. A leveling instrument as defined in claim 2, and a circular cover therefor having a dependent transparent flange which fits over the outer periphery of said trough and is supported thereby.

6. A leveling instrument as defined in claim 3, in which the trough has an outer circumferential bead, and a circular cover for said trough having a dependent transparent flange fitting over the periphery of said trough and resting upon said bead.

7. A leveling instrument as defined in claim 3 in which the bottom of the float is conically concave.

8. A leveling instrument comprising a circular liquid tight trough provided with an outer peripheral bead and a centrally located internal upwardly extending pin, a circular float therein having an upwardly extending flange provided with a plurality of accurately opposed elongated narrow sighting-slots disposed horizontally and positioned at a predetermined distance from the bottom of said float, said float having a conically concave inwardly extending bottom provided with a central aperture slightly larger in diameter than the diameter of said pin, and a circular cover for said trough having a circular top and a dependent flange of a size to extend over the periphery of said trough and to be supported by said bead; at least a portion of said dependent flange being transparent to permit observation of said slots when the float is floating upon liquid contained in said trough.

9. A leveling instrument comprising a liquid-tight trough, and a circular float having a vertical wall provided with an opaque portion having a narrow circumferential sighting-window, said float being adapted freely to float in liquid contained in said trough.

10. A leveling instrument comprising a liquid-tight trough, and a circular float having a vertical wall provided with an opaque portion having a plurality of opposed horizontal narrow sighting-windows, said float being adapted freely to float in liquid contained in said trough.

NORMAN D. NACHTRIEB.

No references cited.